(12) United States Patent
Garrasi

(10) Patent No.: US 10,887,964 B1
(45) Date of Patent: Jan. 5, 2021

(54) SOLID-STATE ELECTRIC POWER DISTRIBUTION MODULE

(71) Applicant: Robert Garrasi, Clifton Park, NY (US)

(72) Inventor: Robert Garrasi, Clifton Park, NY (US)

(73) Assignee: VELOX TECHNOLOGY CORPORATION, Clifton Park, NY (US)

(*) Notice: Subject to any disclaimer, the term of this patent is extended or adjusted under 35 U.S.C. 154(b) by 0 days.

(21) Appl. No.: 17/006,021

(22) Filed: Aug. 28, 2020

Related U.S. Application Data

(60) Provisional application No. 62/893,955, filed on Aug. 30, 2019.

(51) Int. Cl.

| | | |
|---|---|---|
| *H02J 1/10* | (2006.01) | |
| *H02H 3/00* | (2006.01) | |
| *H05B 37/00* | (2006.01) | |
| *H05B 45/37* | (2020.01) | |
| *H05B 45/40* | (2020.01) | |
| *H02H 3/08* | (2006.01) | |
| *H02H 3/42* | (2006.01) | |
| *H02J 1/14* | (2006.01) | |
| *H02H 7/085* | (2006.01) | |
| *H02H 3/20* | (2006.01) | |

(52) U.S. Cl.
CPC ............... *H05B 45/37* (2020.01); *H02H 3/08* (2013.01); *H02H 3/20* (2013.01); *H02H 3/42* (2013.01); *H02H 7/0856* (2013.01); *H02J 1/10* (2013.01); *H02J 1/14* (2013.01); *H05B 45/40* (2020.01)

(58) Field of Classification Search
CPC ...... H05B 45/37; H05B 45/40; H05B 39/041; H05B 39/044; H05B 47/10; H05B 39/04; H02J 1/10; H02J 3/14; H02J 1/00; H02J 7/0029; H03K 17/167; H02M 7/155; H02M 7/217; H02M 5/2573; Y02B 20/30; Y02B 90/20; H01H 71/123; H01H 71/04; H01H 71/1081
See application file for complete search history.

(56) References Cited

U.S. PATENT DOCUMENTS

| | | | | |
|---|---|---|---|---|
| 10,129,948 | B2 * | 11/2018 | Weightman | ....... G11C 11/40626 |
| 10,194,510 | B2 * | 1/2019 | Dadashnialehi | ....... H05B 47/18 |
| 10,541,530 | B2 * | 1/2020 | Kennedy | ............. H01H 71/123 |
| 10,541,620 | B2 * | 1/2020 | Newman, Jr. | .......... H05B 45/37 |
| 10,593,373 | B2 * | 3/2020 | Weightman | ............ G11C 29/12 |
| 10,811,867 | B2 * | 10/2020 | Kennedy | ............. H02H 7/0833 |

* cited by examiner

*Primary Examiner* — Vibol Tan

(57) ABSTRACT

The present innovation discloses a solid-state electric power distribution module. The module comprises an enclosure for housing one or more electrical components of an electrical distribution system. The enclosure comprises input power connections, an air-gap disconnect unit, current sensing devices, isolation devices, analog-to-digital (A-D) converters, a processor and output connections, which are electrically connected using a plurality of conductive tracks. The input power connections receive input power from a power source. The current sensing devices receive the input power and generate analog output current and voltage using the isolation devices, wherein the analog outputs are converted into digital signals using A-D converters. The output connections supply power at pre-established levels to one or more loads after completion of circuit tests, thereby securely transferring power to the loads. Further, an air-gap disconnect unit is configured to disconnect the input power when a fault has occurred.

18 Claims, 3 Drawing Sheets

SOLID-STATE ELECTRIC POWER DISTRIBUTION MODULE

CROSS-REFERENCE TO RELATED APPLICATION

This application claims priority to U.S. Patent Application No. 62/893,955, titled "SOLID-STATE ELECTRIC POWER DISTRIBUTION MODULE" filed on Aug. 30, 2019. The specification of the above referenced patent application is incorporated herein by reference in its entirety.

BACKGROUND OF THE INNOVATION

A. Technical Field

The present innovation generally relates to an energy management system. More specifically, the present innovation relates to an energy management system comprising a multi-functional electrical power distribution module configured to provide effective power distribution to one or more loads.

B. Description of Related Art

In recent years, the necessity of managing and controlling utilization of energy has become exceedingly more important due to the continuous existence of energy shortages and the rapidly increasing cost of energy. Along with increasing demand, energy management systems have also evolved to provide facility control and to monitor energy usage, primarily the usage of electrical energy. The energy management systems in residential, commercial, and industrial applications usually include multiple breakers for receiving electrical power from a utility source. The power is then routed through protection devices to designated branch circuits for distributing to one or more loads. These overcurrent devices are typically circuit breakers, which are designed to interrupt the electrical current if the limits of the conductors supplying the loads are surpassed.

However, the existing energy management systems have limited capabilities, are expensive, and require external computer controls and devices. While complex and relatively expensive computers and peripheral equipment could be used for energy control purposes, the cost of such equipment may limit the availability of energy management and control. Small facilities also need energy management and control, but such systems must be cost-effective. There would be no value to provide energy management if no savings are achieved. The few existing patent applications that attempted to address the aforesaid problem are discussed as follows.

U.S. Pat. No. 6,456,471, Haun et al. entitled "Test, reset and communications operations in an arc fault circuit interrupter with optional memory and/or backup power," discloses an arc fault circuit interrupter system for use with an electrical circuit that includes an arcing fault detector that monitors the electrical circuit, and a controller which generates a trip signal in response to the detection of arcing faults. The controller may also generate one or more communication signals corresponding to information relating to the operation of the arcing fault circuit interrupter. The system may also include one or more of the following: a communication port which communicates to a user the information relating to operation of the arc fault circuit interrupter in response to the communication signals; a memory for retaining predetermined information related to the condition and operation of the arcing fault circuit interrupter, with or without a backup memory; and a combined self-test/reset switch.

U.S. Pat. No. 8,230,575, Veenstra et al., entitled "Overmolded circuit board and method" discloses an electrical device that includes a circuit board having one or more electrical components mounted to the circuit board. At least a portion of the circuit board is encapsulated in a thermoplastic polymer material to encapsulate the electrical components. Further, the electrical device comprises light emitting diodes (LEDs) that may be red-green-blue ("RGB") LEDs. The LEDs are configured to indicate the condition of the electrical device with different colors.

However, the above-mentioned prior arts deal with energy management and protecting the circuit or device by conducting a particular fault test, i.e., an arc fault. The condition of the devices or circuit boards of the energy management is represented by illuminating multiple LEDs with different colors. Also, it requires continuous monitoring and additional equipment for checking faults in the circuits or devices.

In general, a power distribution module, whose input terminal, distribution lines, and output terminals are exposed to the exterior, is connected to a stabilizer or a circuit breaker. However, the conventional power distribution panel has disadvantages: i.e., the installation cost is increased, the panel is exposed to danger of accidents, and the panel cannot be flexibly operated in facilities because the output control of the load sides is individually fixed.

Therefore, there is a need for a solid-state electric power distribution module based system having multiple electronic modules integrated with a microcontroller for securely transferring power to one or more loads. There is also a need for a solid-state electric power distribution module based system to continuously monitor the one or more loads, which are connected to the main power panel by conducting various fault tests. Further, there is also a need to provide a solid-state electric power distribution module based system to continuously regulate and control the one or more loads, which are connected to the module.

SUMMARY OF THE INNOVATION

An electrical power distribution solid-state, module-based system to provide effective power distribution is disclosed. The power distribution module comprises an enclosure for housing one or more electrical components of an electrical distribution module based system. The enclosure is made of a material that includes, but not limited to, a metal, plastic, or other suitable material and/or composites. The enclosure comprises one or more input power connections, an air-gap disconnect unit, one or more current sensing devices, one or more isolation devices, one or more analog-to-digital (A-D) converters, a processor and one or more output connections. The one or more input power connections are configured to receive an input power from a power source or an electric supply line. The air-gap disconnect unit is electrically connected in series with the one or more input power connections via a plurality of conductive tracks. In another embodiment, the air-gap unit is configured to disconnect the input power when a default or a fault condition is detected and when the solid-state circuit did not de-activate the circuit.

In one embodiment, the one or more current sensing devices are connected to the one or more input power connections via a switchable contacts and the plurality of conductive tracks. The one or more current sensing devices are configured to monitor and generate an analog output current and voltage relative to the current levels being sensed in the plurality of conductive tracks. In another embodiment, the one or more isolation devices are electrically connected to the one or more current sensing devices via the plurality of conductive tracks. The one or more isolation devices are configured to generate the analog output current and voltage relative to the current levels being sensed in the plurality of conductive tracks.

In one embodiment, the one or more A-D converters are electrically connected to the one or more isolation devices via the plurality of conductive tracks. The one or more A-D converters are configured to convert the analog outputs generated by the one or more isolation devices into the digital signals. In another embodiment, the processor is electrically connected to the one or more A-D converters. The processor is configured to execute and control the operation of the solid-state electric power distribution module. In another embodiment, the one or more output connections are configured to supply the power at pre-established levels to one or more loads from the input power line after completion of circuit tests, thereby securely transferring the power to the one or more loads. The circuit tests include an open circuit test, a short circuit test, arc faults, a ground fault interrupt test, and any other electrical circuit tests determined to be necessary and useful to a consumer and/or required by an electrical utility.

In one embodiment, the solid-state electric power distribution module based system includes a microcontroller. The microcontroller is configured to allow the consumer to control the power supplied to the one or more loads connected to the solid-state electric power distribution module. Additionally, the microcontroller disconnects the power supplied to the one or more loads when the circuit test has failed or drawn over current. In another embodiment, the microcontroller is further configured to store the data related to current levels, voltage levels, power consumption, power demand patterns, and any other information derived to be useful to the consumer or to the electric utility company that supplies electric power to the consumer. In another embodiment, the microcontroller is further configured to control and monitor the one or more loads to prevent and protect the system from various malfunctions such as over current demands, unauthorized connections, and short circuits. In another embodiment, the microcontroller is configured to control the one or more loads.

In one embodiment, the solid-state electric power distribution module further comprises one or more data transmission connections. The one or more data transmission connections are configured to enable the user to receive data from the microcontroller. In another embodiment, the solid-state electric power distribution module is further configured to transfer data to other solid-state electric power distribution modules via a data transmission bus.

In one embodiment, the solid-state electric power distribution module further comprises one or more light emitting devices (LEDs). The LEDs are securely positioned on a front portion of the solid-state electric power distribution module. In another embodiment, one or more LEDs are configured to indicate the condition of the load that is connected to the output power lines of the solid-state electric power distribution module. In another embodiment, the one or more LEDs are further configured to indicate the active state and ON state of the load that is connected to the output power lines of the solid-state electric power distribution module with a green color. In another embodiment, the one or more LEDs are further configured to indicate the non-active state and OFF state of the load that is connected to the output power lines of the solid-state electric power distribution module with a red color. In another embodiment, the one or more LEDs are further configured to indicate the fault condition and non-active state of the load that is connected to the output power lines of the solid-state electric power distribution module by blinking the red color. In another embodiment, the one or more LEDs are further configured to indicate different fault conditions and non-active state of the load that is connected to the output power lines of the solid-state electric power distribution module by blinking the red color with different blinking frequencies.

In one embodiment, the solid-state electric power distribution module further comprises a push button. The push button is securely positioned on the front portion of the solid-state electric power distribution module. In another embodiment, the push button is configured to enable the user to reset the fault condition of the solid-state electric power distribution module after correcting the fault condition. In another embodiment, the solid-state electric power distribution module includes additional software. In another embodiment, the software is configured to perform various circuit tests. The circuit tests include, but are not limited to, an open circuit test, a short circuit test, arc faults, a ground fault interrupt test and any other electric circuit tests determined to be necessary, required, and/or useful to a consumer or an electric utility. In another embodiment, the software is configured to allow the consumer to control the power supplied to the one or more loads connected to the solid-state electric power distribution module. The software is also configured to disconnect the power supplied to the one or more loads connected to the solid-state electric power distribution module when the circuit test has failed or has drawn over current.

Other objects, features and advantages of the present innovation will become apparent from the following detailed description. It should be understood, however, that the detailed description and the specific examples, while indicating specific embodiments of the innovation, are given by way of illustration only, since various changes and modifications within the spirit and scope of the innovation will become apparent to those skilled in the art from this detailed description.

BRIEF DESCRIPTION OF DRAWINGS

The foregoing summary, as well as the following detailed description of the innovation, is better understood when read in conjunction with the appended drawings. For the purpose of illustrating the innovation, exemplary constructions of the innovation are shown in the drawings. However, the innovation is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF EMBODIMENTS

A description of embodiments of the present innovation will now be given with reference to the Figures. It is expected that the present innovation may be embodied in other specific forms without departing from its spirit or essential characteristics. The described embodiments are to be considered in all respects only as illustrative and not restrictive.

Figure 1:
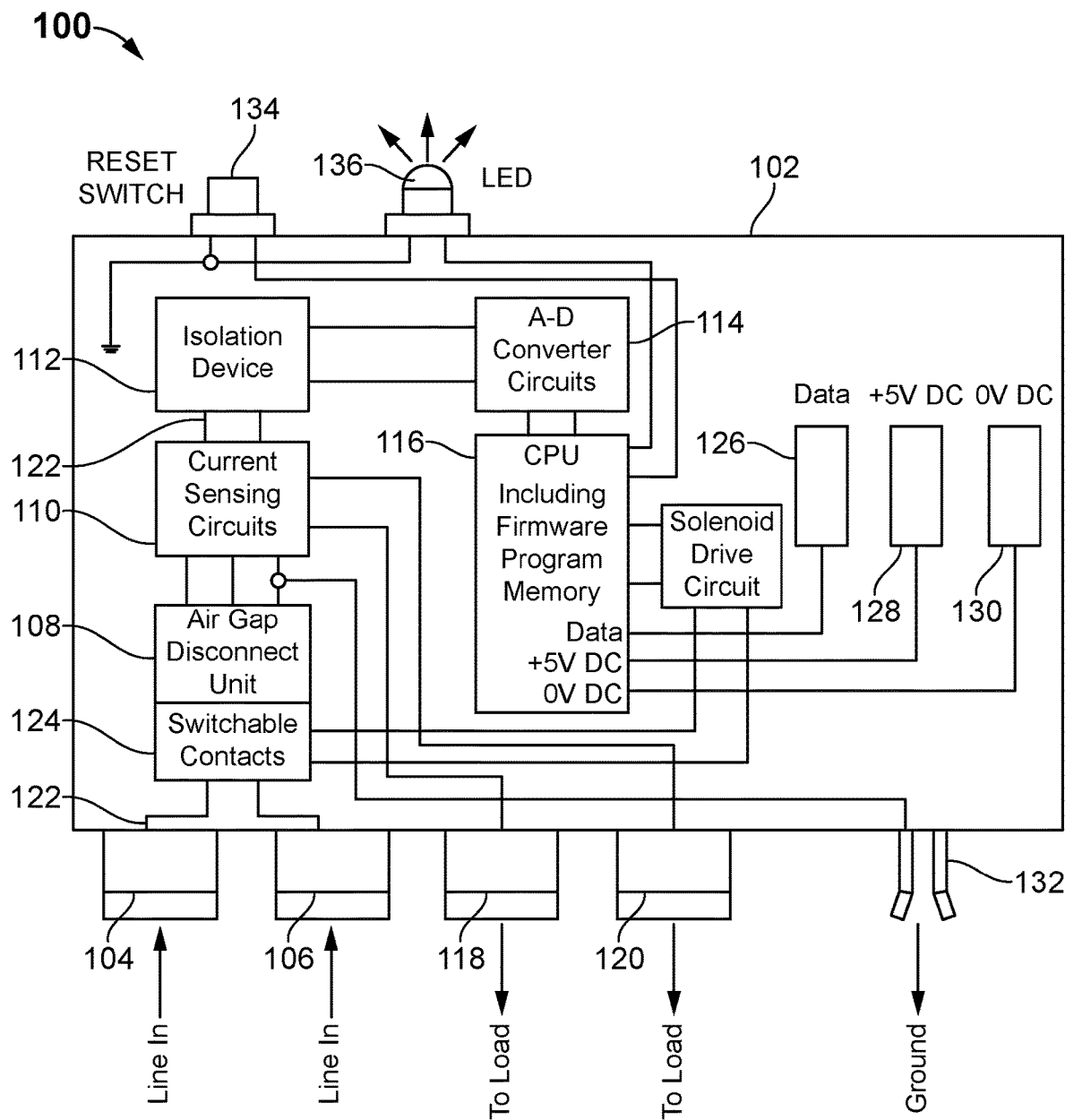
FIG. 1 shows a solid-state electric power distribution module with an electric circuit in an embodiment of the present innovation.

Referring to FIG. 1, the innovation discloses a solid-state electric power distribution module 100 that is configured to provide effective power distribution. In one embodiment, the power distribution module 100 comprises an enclosure or a housing 102. The enclosure 102 used for housing one or more electrical components of an electrical distribution system. In another embodiment, the enclosure 102 comprises at least one input power connection/port 104 with a neutral connection/port 106, an air-gap disconnect unit 108, one or more current sensing devices 110, one or more isolation devices 112, one or more analog-to-digital (A-D) converters 114, a processor or a central processing unit (CPU) 116, and one or more output connections 118 with a neutral connection/port 120. In another embodiment, the input connection 104 and the neutral connection 106 are configured to enable a user to electrically connect to a power source or an electric supply line for receiving input power via power cables. In another embodiment, the air-gap disconnect unit 108 is electrically connected in series with the input power connection 104 and the neutral connection 106 using conductive tracks or lines 122. The air-gap disconnect unit 108 is configured to disconnect the input power when a fault condition has detected or occurred within the power distribution module 100. In another embodiment, the current sensing device 110 is operatively positioned between the isolation device 112 and switchable contacts 124 using the plurality of conductive tracks 122. The current sensing device 110 is configured to monitor and generate an analog output current and voltage relative to the current levels being sensed in the plurality of conductive tracks or lines 122. In another embodiment, the isolation device 112 is electrically connected to the current sensing device 110 via the plurality of conductive tracks or lines 122. The isolation device 110 is configured to receive analog output current and voltage received from the current sensing device 110 and isolates the alternating current (AC) voltages from the direct current (DC) voltages for the low voltage circuitry.

In one embodiment, the analog-to-digital (A-D) converter 114 is electrically connected to the isolation device 112 using the plurality of conductive tracks or lines 122. The analog-to-digital (A-D) converter 114 is configured to convert analog outputs generated by the isolation device 112 into digital signals. In another embodiment, the processor or CPU 116 is electrically connected to the analog-to-digital (A-D) converter 114 using the plurality of conductive tracks or lines 122. The processor 116 is configured to execute and control the operation of the power distribution module 100. In another embodiment, the processor 116 comprises a firmware program memory. In another embodiment, the output connection or port 118 with the neutral connection/port 120 are configured to supply power at pre-established levels to one or more loads from the input power after completion of circuit tests by the power distribution module 100, thereby securely transferring power to the one or more loads. In another embodiment, the power distribution module 100 further comprises one or more data transmission connections or ports 126, DC power supply connections (130 and 128), a reset switch or a push-button 134, at least one light emitting diode (LED) 136, and a ground connection 132.

Figure 2:
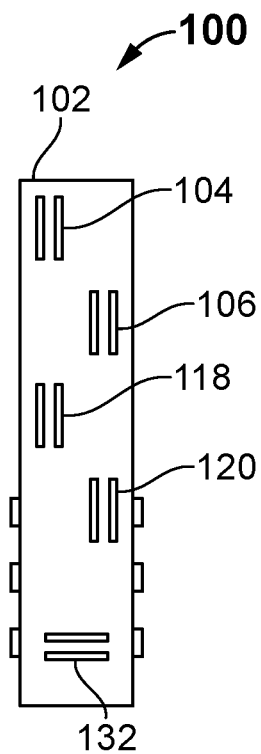
FIG. 2 shows a rear view of the solid-state electric power distribution module provided with one or more input power connections and output connections on a rear portion in one embodiment of the present innovation.
Figure 3:
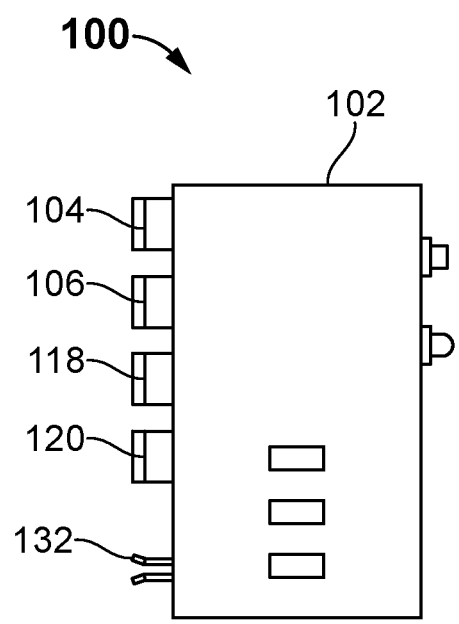
FIG. 3 shows a left-side view of the solid-state electric power distribution module with one or more data transmission connections in one embodiment of the present innovation.

Referring to FIGS. 2-3, the power connections of the power distribution module 100 is disclosed. In an exemplary embodiment, the module 100 further comprises at least one input power connection 104 with at least one neutral connection/port 106 and at least one output connection/port 118 with a neutral connection/port 120. The input power connection 104 with the neutral connection/port 106 is electrically connected to a power supply for receiving electrical power from a power source or an electrical supply line. The output connection/port 118 with the neutral connection/port 120 are electrically connected to one or more loads via power cables. The output connection/port 118 with the neutral connection/port 120 are configured to supply power at pre-established levels to one or more loads from the input power after completion of circuit tests by the power distribution module 100, thereby securely transferring electrical power to the one or more loads.

Figure 4:
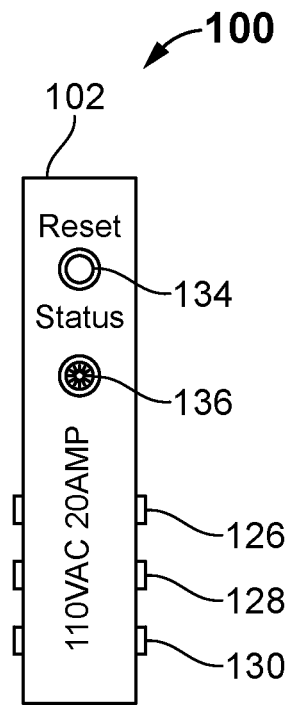
FIG. 4 shows a front view of the solid-state electric power distribution module provided with a reset switch and a light emitting diode (LED) in one embodiment of the present innovation.
Figure 5:
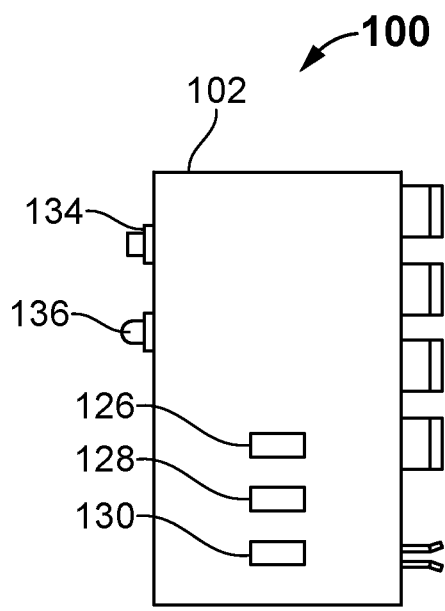
FIG. 5 shows a right-side view of the solid-state electric power distribution module in one embodiment of the present innovation.

Referring to FIGS. 4-5, the data transmission connections/ports 126 and DC power supply connections (130 and 128) of the power distribution module 100 are disclosed. In another embodiment, the data transmission connections/ports 126 are connected to the processor or CPU 116 (shown in FIG. 1) of the power distribution module 100 via the conductive track 122. The data transmission connections/ports 126 are securely positioned on, but not limited to, side portions of the power distribution module 100. The data transmission connections/ports 126 are configured to enable the user to access and receive data stored within the processor 116. In another embodiment, the DC power supply connections (130 and 128) are configured to enable the user to connect 0 v-5 v DC voltages.

In one embodiment, the power distribution module 100 further includes and comprises at least one reset switch or a push-button 134 and at least one LED 136. In another embodiment, the reset switch 134 is securely and operatively positioned on, but not limited to, a front portion of the power distribution module 100. The reset switch 134 is configured to enable the user to reset the fault condition of the power distribution module after the fault condition has been corrected. In another embodiment, at least one LED 136 is securely positioned on, but not limited to, the front portion of the power distribution module 100. In another embodiment, the LED 136 is a multi-colored LED. The LED 136 is configured to indicate the condition of the power distribution module 100 by illuminating different colors. The LED 136 is configured to indicate the condition of one or more loads that are connected to the output connection/port 118 and the neutral port 120 of the power distribution module 100. The LED 136 is further configured to indicate the active state and ON state of the load that is connected to the output connection/port 118 and the neutral port 120 of the power distribution module 100 with a green color. The LED 136 is further configured to indicate the non-active state and OFF state of the load that is connected to the output connection/port 118 and the neutral port 120 of the power distribution module 100 with a red color. The LED 136 is further configured to indicate the fault condition and non-active state of the load that is connected to the output connection/port 118 and the neutral port 120 of the power distribution module 100 by a blinking red colored light. In another embodiment, the LED 136 is further configured to indicate different fault conditions and non-active state of the load that is connected to the output connection/port 118 and the neutral port 120 of the power distribution module 100 by blinking the red color light with different blinking frequencies.

In one embodiment, the power distribution module 100 further comprises and includes a microcontroller. The microcontroller is configured to allow the user to control the electric power supplied to the one or more loads, which are connected to the power distribution module 100 and disconnect the power supply when the circuit test has failed or has drawn over current by one or more loads. In another embodiment, the microcontroller is further configured to store data related to current levels, voltage levels, power consumption, power demand patterns, and any other information derived to be useful, and/or necessary to the consumer or useful and/or necessary or required by the electric utility company that supplies electric power to the consumer. In another embodiment, the microcontroller is further configured to control and monitor one or more loads to prevent and protect from over current demands, unauthorized connections, and short circuits, wherein the microcontroller is further configured to control one or more loads. In another embodiment, the power distribution module 100 includes additional software. In another embodiment, the software is configured to perform various circuit tests when a load is connected to the power distribution module 100. The circuit tests include, but are not limited to, an open circuit test, a short circuit test, arc faults, a ground fault interrupt test, and any the tests determined to be useful/necessary to a consumer or useful/necessary and/or required by an electric utility. In another embodiment, the software is further configured to allow the user to control the power supplied to the loads, which are connected to the power distribution modules 100 and disconnect the power supply when the circuit test has failed or has drawn over current by the load.

Preferred embodiments of this innovation are described herein, including the best mode known to the innovators for carrying out the innovation. It should be understood that the illustrated embodiments are exemplary only and should not be taken as limiting the scope of the innovation.

The foregoing description comprise illustrative embodiments of the present innovation. Having thus described exemplary embodiments of the present innovation, it should be noted by those skilled in the art that the within disclosures are exemplary only, and that various other alternatives, adaptations, and modifications may be made within the scope of the present innovation. Merely listing or numbering the steps of a method in a certain order does not constitute any limitation on the order of the steps of that method. Many modifications and other embodiments of the innovation will come to mind to one skilled in the art to which this innovation pertains having the benefit of the teachings in the foregoing descriptions. Although specific terms may be employed herein, they are used only in generic and descriptive sense and not for purposes of limitation. Accordingly, the present innovation is not limited to the specific embodiments illustrated herein.

What is claimed is:

1. A solid-state electric power distribution module, comprised of:

an enclosure for housing one or more electrical components of an electrical distribution system; wherein the enclosure comprises:

one or more input power connections configured to receive input power from a power source;

an air-gap disconnect unit electrically connected in series with the one or more input power connections via a plurality of conductive tracks, wherein the air-gap disconnect unit is configured to disconnect the input power when a fault condition is occurred and the solid-state circuit didn't deactivate the circuit;

one or more current sensing devices connected to the one or more input power connections via a switchable contacts and the plurality of conductive tracks, wherein the one or more current sensing devices are configured to monitor and generate an analog output current and voltage relative to the electric current levels being sensed in the plurality of conductive tracks;

one or more isolation devices electrically connected to the one or more current sensing devices via the plurality of conductive tracks, wherein the one or more isolation devices are configured to receive the analog output current and voltage from the one or more current sensing devices and isolate AC voltages from the DC voltages;

one or more analog-to-digital (A-D) converters electrically connected to the one or more isolation devices via the plurality of conductive tracks, wherein the one or more analog-to-digital converters are configured to convert analog outputs generated by the one or more isolation devices into digital signals;

a processor electrically connected to the one or more analog-to-digital (A-D) converters, wherein the processor is configured to execute and control the operation of the solid-state electric power distribution module, and one or more output connections configured to supply power at pre-established levels to one or more loads from the input power line after completion of circuit tests, thereby securely transferring power to the more loads.

2. The solid-state electric power distribution module of claim 1, wherein the enclosure is made of a material that may include a metal, plastic, or other suitable materials, and/or composites.

3. The solid-state electric power distribution module of claim 1, wherein the circuit tests include an open circuit test, a short circuit test, arc faults, a ground fault interrupt test, and any tests determined to be useful, necessary or required to or by a consumer or an electric utility.

4. The solid-state electric power distribution module of claim 1, further includes and is comprised of a microcontroller, configured to allow a user to control the electrical power supplied to the one or more loads, which are connected to the solid-state electric power distribution module and disconnect the power supply when the circuit test has failed or has drawn over current by one or more loads.

5. The solid-state electric power distribution module of claim 1, wherein the microcontroller is configured to store data related to current levels, voltage levels, power consumption, power demand patterns, and any other information determined to be useful, necessary or required to or by a consumer or an electric utility company that supplies electric power to the consumer.

6. The solid-state electric power distribution module of claim 1, wherein the microcontroller is further configured to control and monitor one or more loads to prevent and protect from over current demands, unauthorized connections, and short circuits, wherein the microcontroller is further configured to control one or more loads.

7. The solid-state electric power distribution module of claim 1, further comprises one or more data transmission connections, configured to enable the user to receive data from the microcontroller.

8. The solid-state electric power distribution module of claim 1, is further configured to transfer data to other solid-state electric power distribution modules via a data transmission bus.

9. The solid-state electric power distribution module of claim 1, further comprises one or more light emitting devices (LEDs), securely positioned on a front portion of the solid-state electric power distribution module, wherein the one or more LEDs are multi-colored LEDs.

10. The solid-state electric power distribution module of claim 9, wherein the one or more LEDs are configured to indicate the condition of the solid-state electric power distribution module.

11. The solid-state electric power distribution module of claim 9, wherein the one or more LEDs are configured to indicate the condition of the one or more loads that are connected to the output power lines of the solid-state electric power distribution module.

12. The solid-state electric power distribution module of claim 9, wherein the one or more LEDs are further configured to indicate the active state and ON state of the load that is connected to the output power lines of the solid-state electric power distribution module with a green color.

13. The solid-state electric power distribution module of claim 9, wherein the one or more LEDs are further configured to indicate the non-active state and OFF state of the load that is connected to the output power lines of the solid-state electric power distribution module with a red color.

14. The solid-state electric power distribution module of claim 9, wherein the one or more LEDs are further configured to indicate the fault condition and non-active state of the load that is connected to the output power lines of the solid-state electric power distribution module by blinking the red color.

15. The solid-state electric power distribution module of claim 9, wherein the one or more LEDs are further configured to indicate different fault conditions and non-active state of the load that is connected to the output power lines of the solid-state electric power distribution module by blinking the red color with different blinking frequencies.

16. The solid-state electric power distribution module of claim 1, further comprises a push button, securely positioned on the front portion of the solid-state electric power distribution module, wherein the push button is configured to enable the user to reset the fault condition of the solid-state electric power distribution module after the fault condition has been corrected.

17. The solid-state electric power distribution module of claim 1, further comprises a software module, wherein the software module is configured to perform various circuit tests when a load is connected to the solid-state electric power distribution module, wherein the circuit tests include an open circuit test, a short circuit test, arc faults, a ground fault interrupt test, and any the tests determined to be useful to a consumer or an electrical utility.

18. The solid-state electric power distribution module of claim 17, wherein the software is configured to allow the consumer to control the power supplied to the one or more loads connected to the solid-state electric power distribution module and disconnect the power supply when the circuit test is failed or drawn over current by the one or more loads.

\* \* \* \* \*

UNITED STATES PATENT AND TRADEMARK OFFICE
CERTIFICATE OF CORRECTION

PATENT NO. : 10,887,964 B1  
APPLICATION NO. : 17/006021  
DATED : January 5, 2021  
INVENTOR(S) : Robert Garrasi et al.

Page 1 of 1

It is certified that error appears in the above-identified patent and that said Letters Patent is hereby corrected as shown below:

On the Title Page

Under item (12), "Garrasi" should read --Garrasi et al.--

Item (72), Inventors: add --Clay C. Cooper III, Clifton Park, NY (US); Douglas Vrooman II, Boynton Beach, FL (US)--

Signed and Sealed this  
Twenty-first Day of December, 2021

Drew Hirshfeld  
*Performing the Functions and Duties of the*  
*Under Secretary of Commerce for Intellectual Property and*  
*Director of the United States Patent and Trademark Office*